Sept. 28, 1937.　　　　J. F. BROBSON　　　　2,094,290
INTERNAL COMBUSTION ENGINE
Filed Feb. 24, 1936　　　10 Sheets-Sheet 1

Inventor
JOHN F. BROBSON
By Richey & Watts
Attorneys

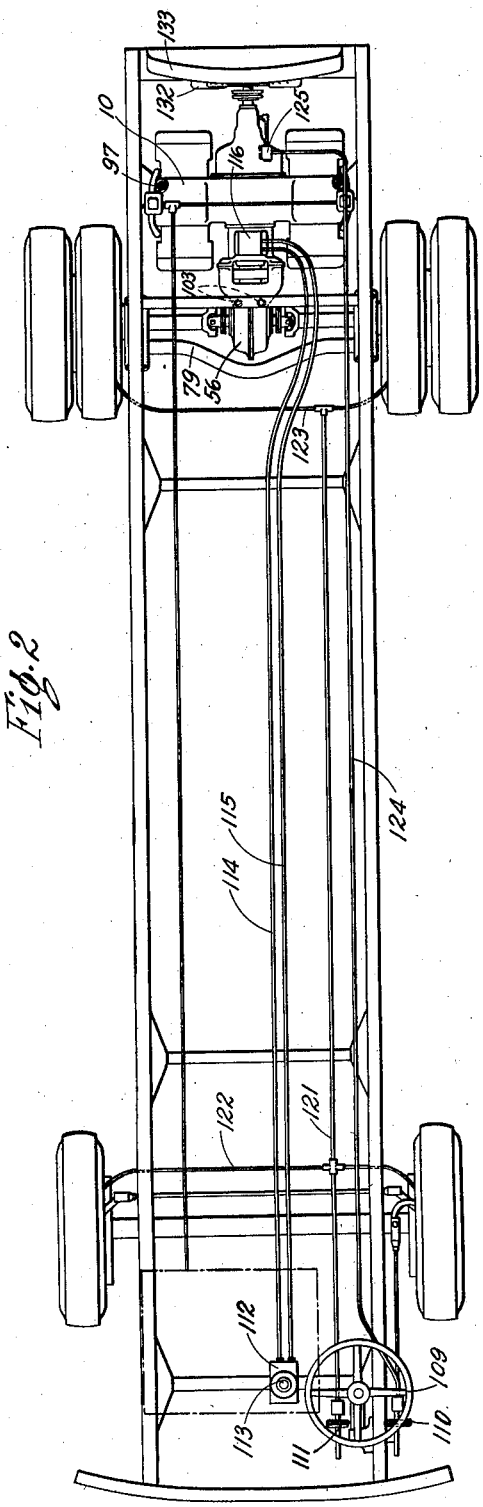

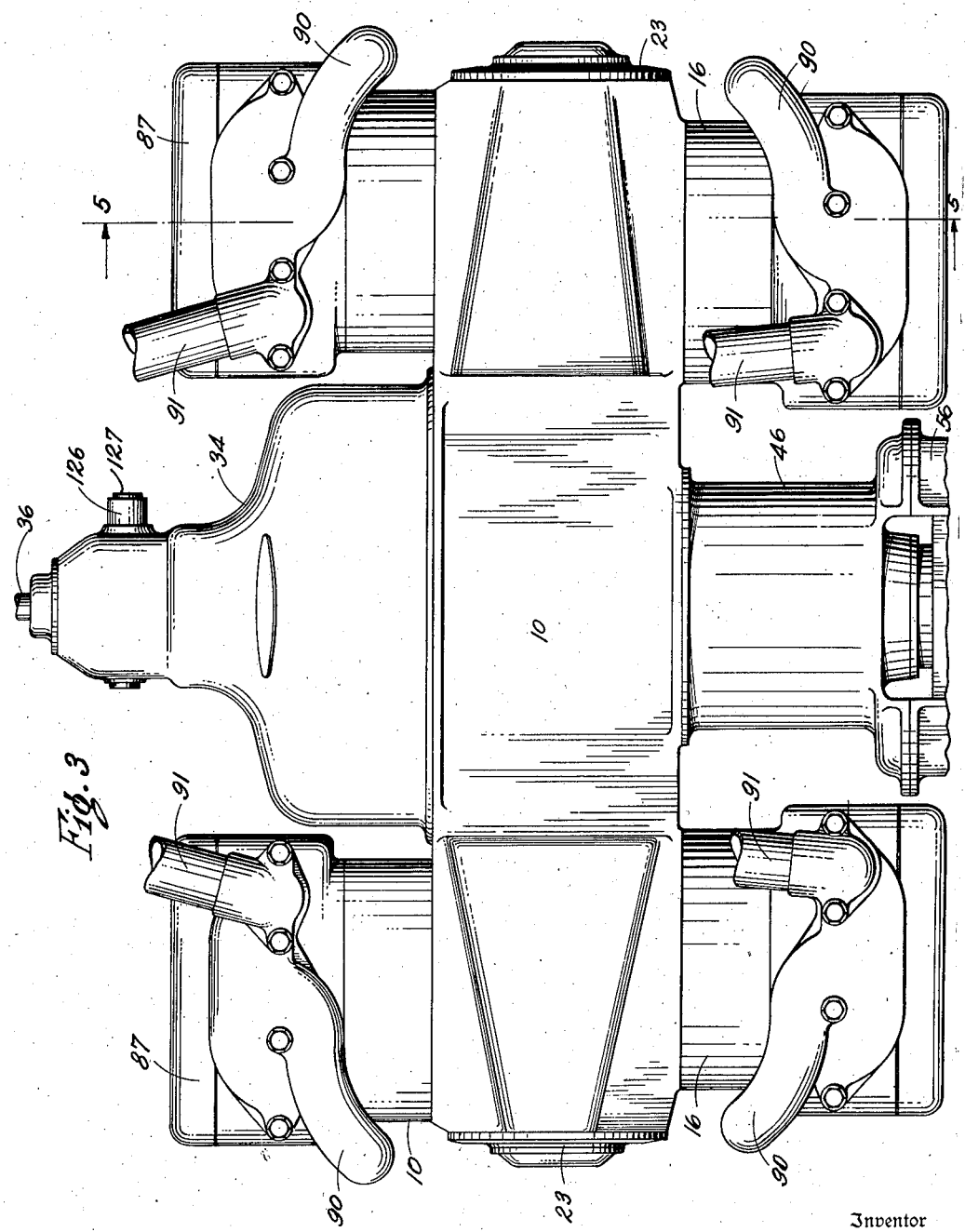

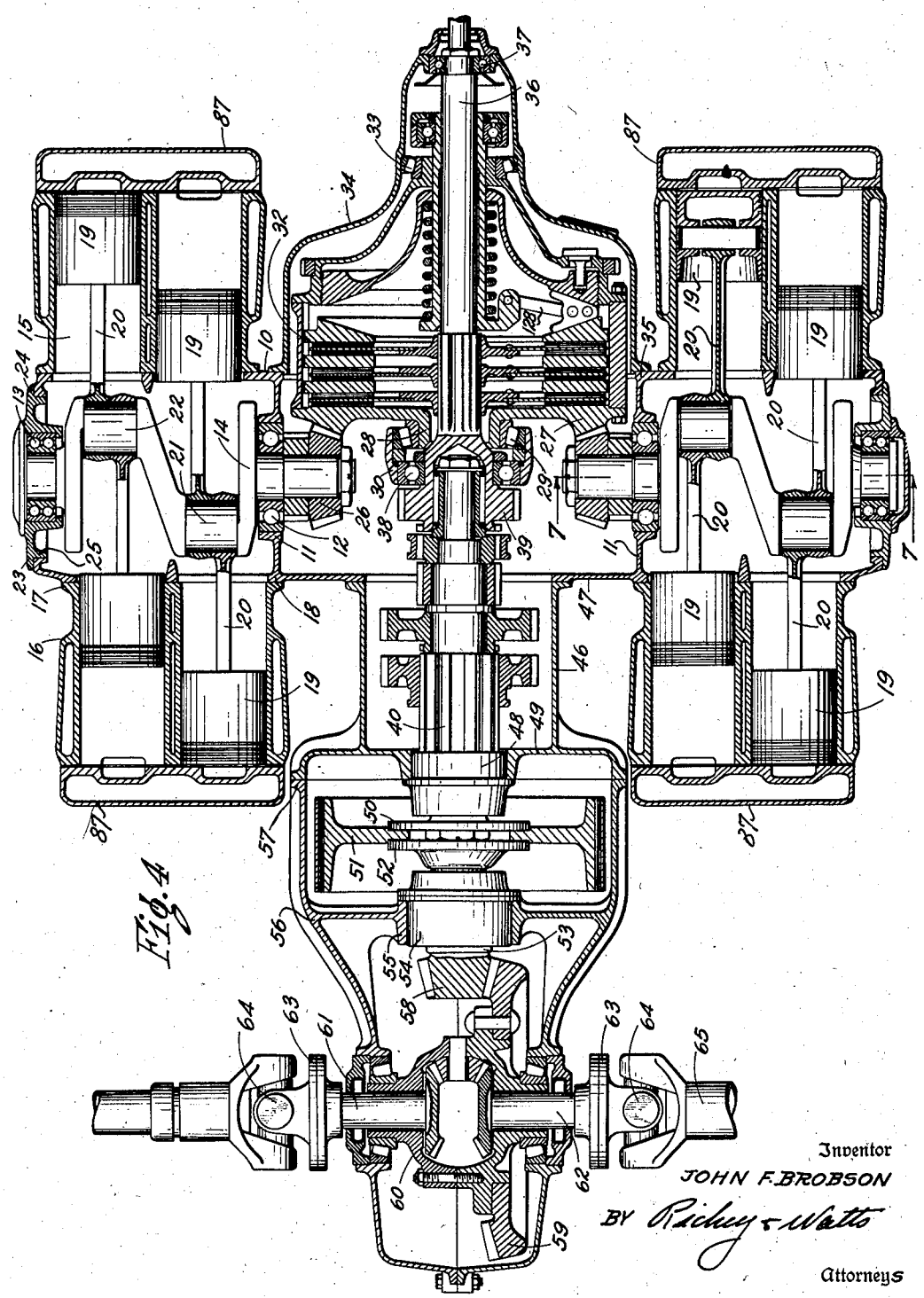

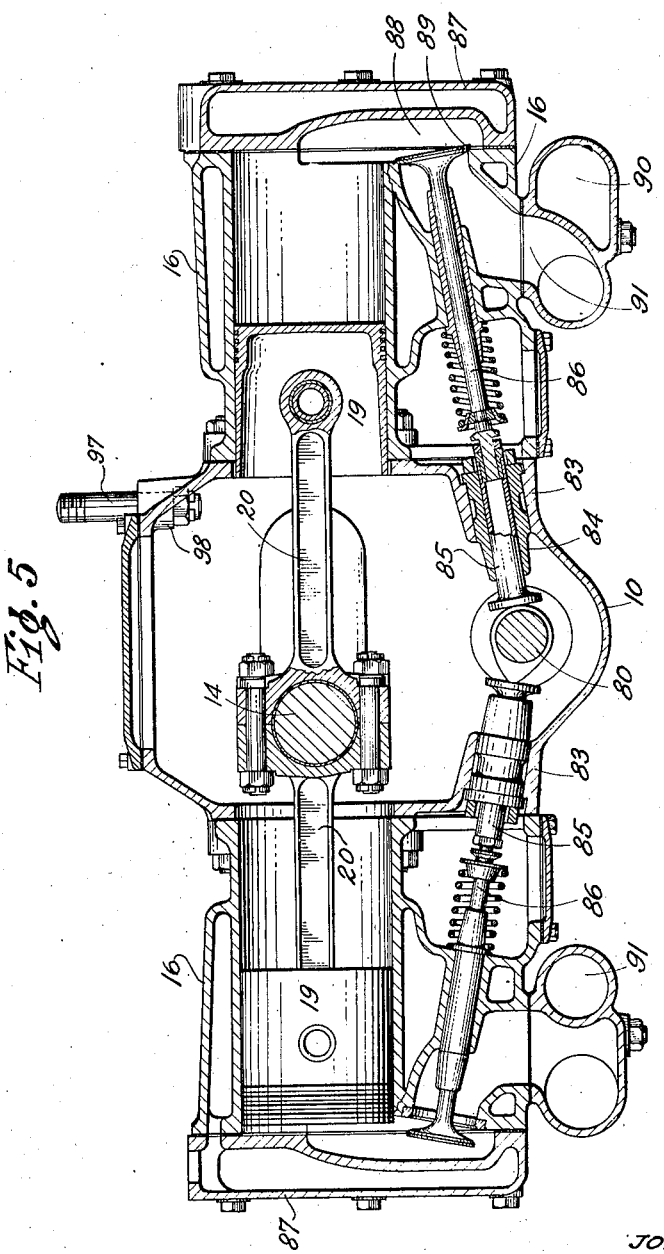

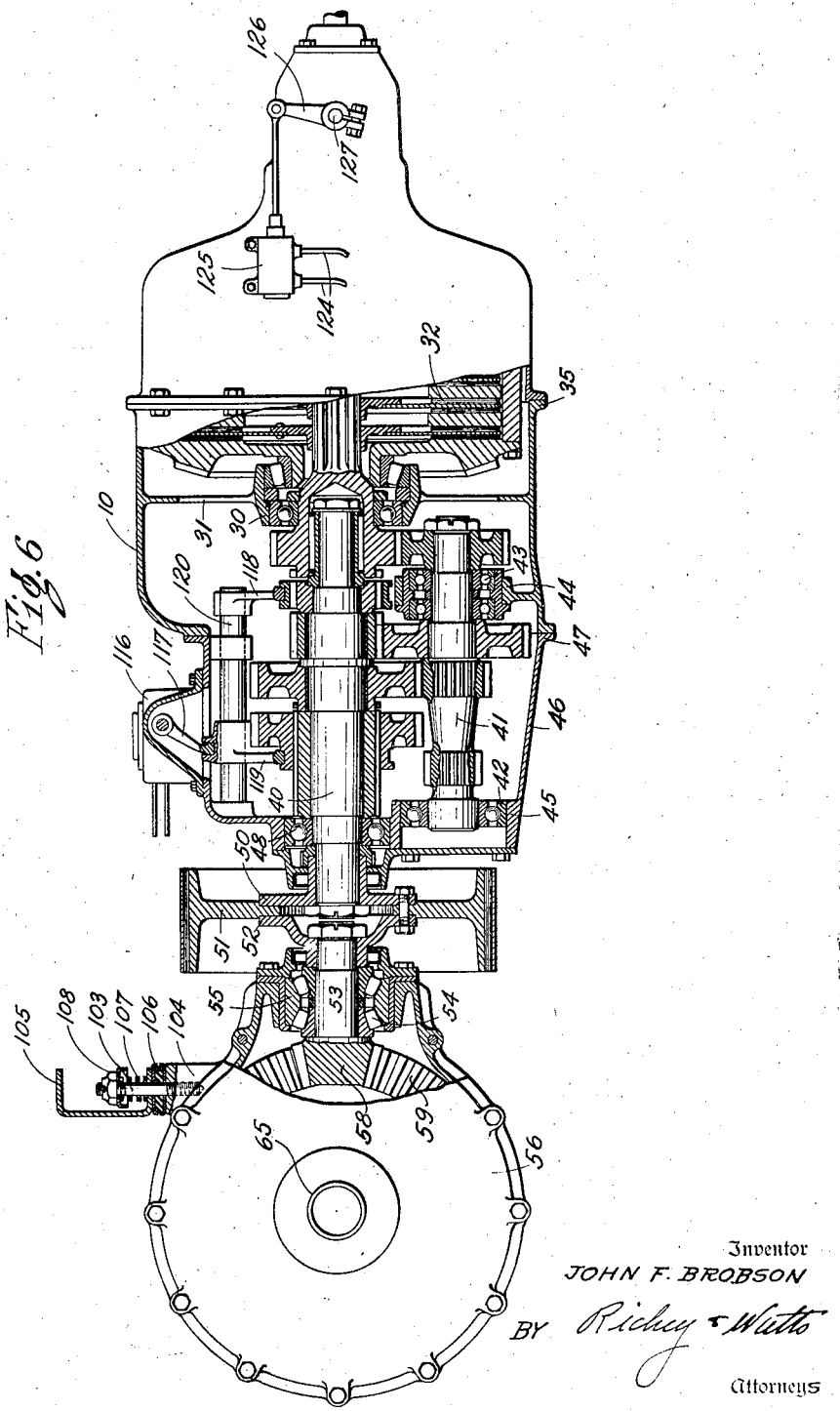

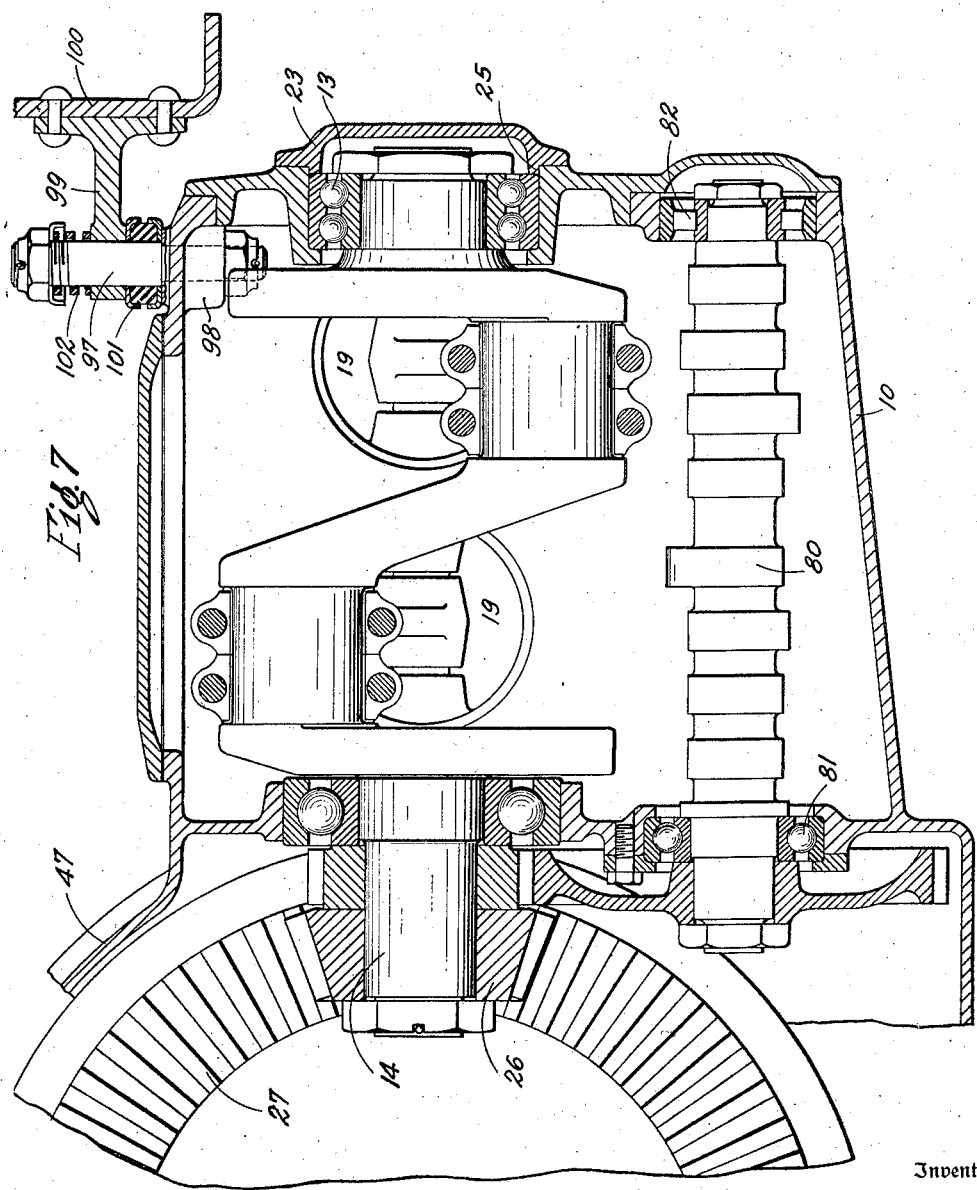

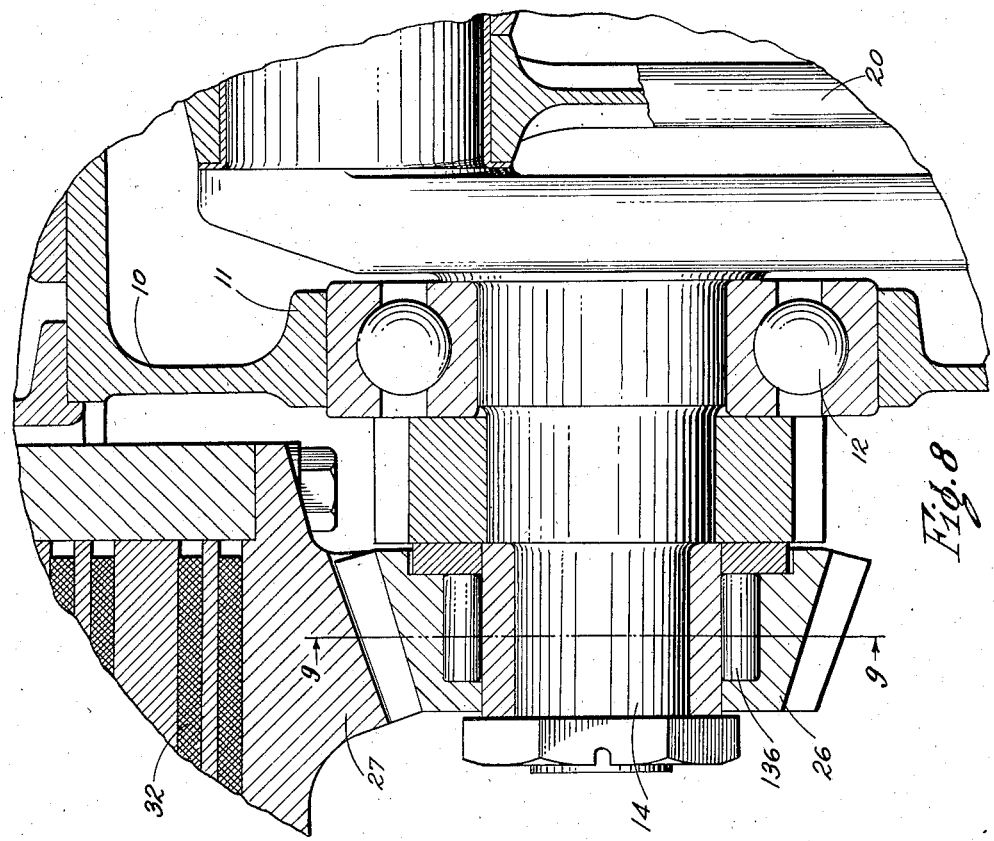
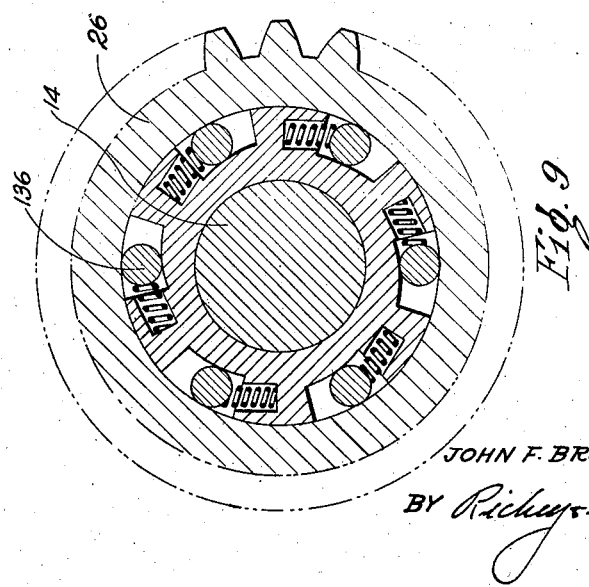

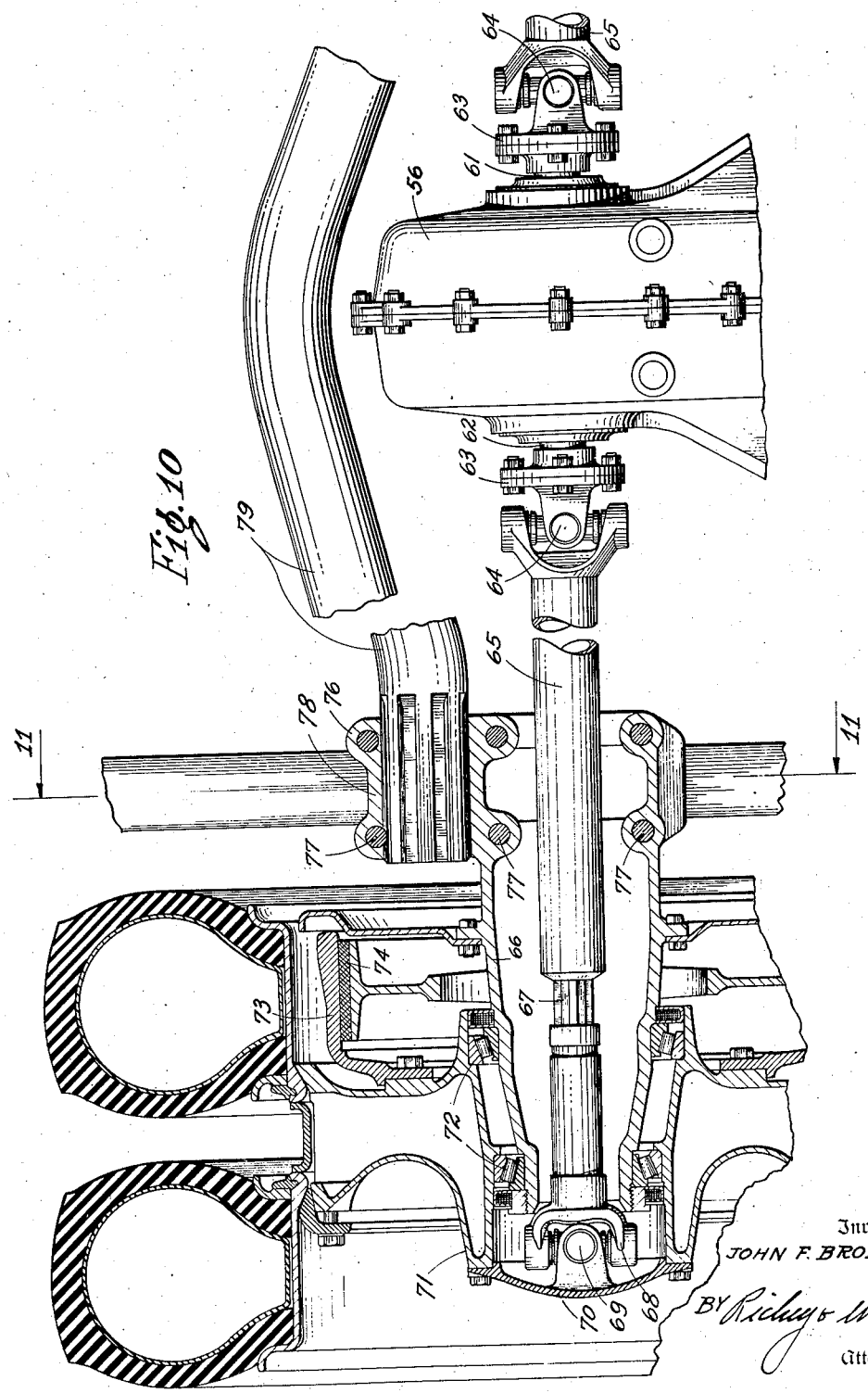

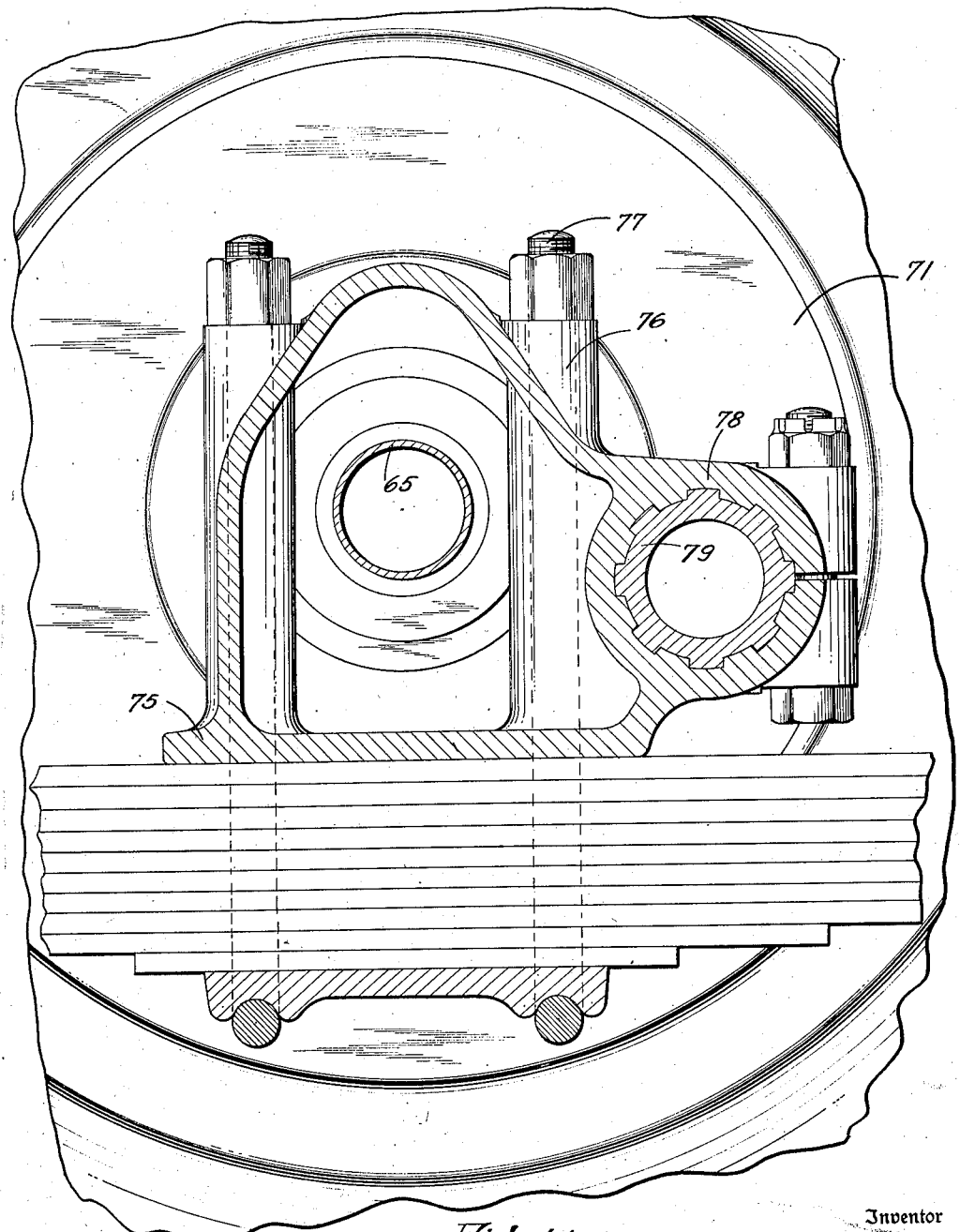

Patented Sept. 28, 1937

2,094,290

UNITED STATES PATENT OFFICE 2,094,290

INTERNAL COMBUSTION ENGINE

John F. Brobson, Detroit, Mich., assignor of one-half to George A. Le Blanc, Detroit, Mich.

Application February 24, 1936, Serial No. 65,289

8 Claims. (Cl. 180—54)

This invention relates broadly to internal combustion engines and more specifically to an improved multi-cylinder engine adapted for variable power application through operation of the separate cylinder or engine units thereof.

In detail the engine comprises a drive gear housing formed to receive a plurality of cylinder units each provided with independent crank shafts and driving connections, the cylinder units or engines being organized for operation singly or collectively with the master gear so that a single power unit may be employed under low torque load applications but additional cylinder units may be operated at the will of the operator as the power demands increase. The invention also comprehends an improved power transmission mechanism which when applied as a vehicular driving unit eliminates the drive shaft torque tube and similar driving connections common to vehicles having the prime mover remote from the driven elements.

One of the objects of the invention is to provide an engine comprising a plurality of engine units adapted for simultaneous operation or in combination to meet the variable loads imposed upon the engine.

The invention further contemplates a power transmission mechanism operatively coordinated with the improved engine, a vehicle chassis and control assembly therefor and a more compact and flexible power unit than has been constructed heretofore. In addition to certain basic features of construction the engine further contemplates a design which facilitates the ready assembly and removal of parts for the purposes of adjustment and repair and the ready removal of the engine as a unit from the vehicle frame with which it is associated.

Another object of the invention is to construct an engine in which the proportion of the height is materially less than the width thereof, thus accommodating the engine to installations where economy of space is an important factor of the design.

Another object of the invention is to construct an engine unit including a transmission gearing, a vehicular brake, differential and drive shaft assembly.

Another object of the invention is to construct an engine which is economical of manufacture and so designed that the cylinder unit assemblies may be dismantled and readily renewed without alteration of the remaining portions of the assembly.

Other objects more or less ancillary of the foregoing and the manner in which all the various objects are realized will appear in the following description which, considered in connection with the accompanying drawings, sets forth the preferred embodiment of the invention.

In the accompanying drawings the improved engine is illustrated in conjunction with a motor bus, which vehicle is chosen merely as one form of vehicle to which the improved engine and transmission may be applied, it being understood, however, that the engine per se and certain features of the transmission mechanism are adapted for use in other environs, such for instance as airplanes, passenger cars and trucks, and that such applications are contemplated as falling within the purview of the present invention.

In the drawings illustrating the exemplification of the motor bus installation:

Fig. 2 is a plan view of a vehicle chassis showing somewhat diagrammatically the arrangement of the engine therein, the controls therefor and the manner in which the engine may be supported on the vehicular frame.

Fig. 3 is a plan view of the lower face of the engine shown in the assembly illustrated in Fig. 2;

Fig. 4 is a transverse horizontal section through the medial axis of the engine;

Fig. 5 is a vertical section taken on a plane indicated by the line 5—5 in Fig. 3;

Fig. 6 is a longitudinal section through the central portion of the engine, the end portions of the figure being shown in elevation;

Fig. 7 is a transverse section taken on the plane indicated by the line 7—7 in Fig. 4, the section being shown on an enlarged scale;

Fig. 8 is a detailed sectional view of a fragmentary portion of a drive gear intermediate one of the cylinder units and the master driving gear illustrating one form of driving connection adaptable for use therein.

Fig. 9 is a vertical section taken on the plane indicated by the line 9—9 in Fig. 8;

Fig. 10 is a plan view partially in section of the forward end of the transmission mechanism including a sectional view through one of the vehicular wheels and the driving connections therefor; and Fig. 11 is a vertical sectional view through the vehicle rear wheel, the section being taken on the plane indicated by the line 11—11 in Fig. 10.

Figure 1:
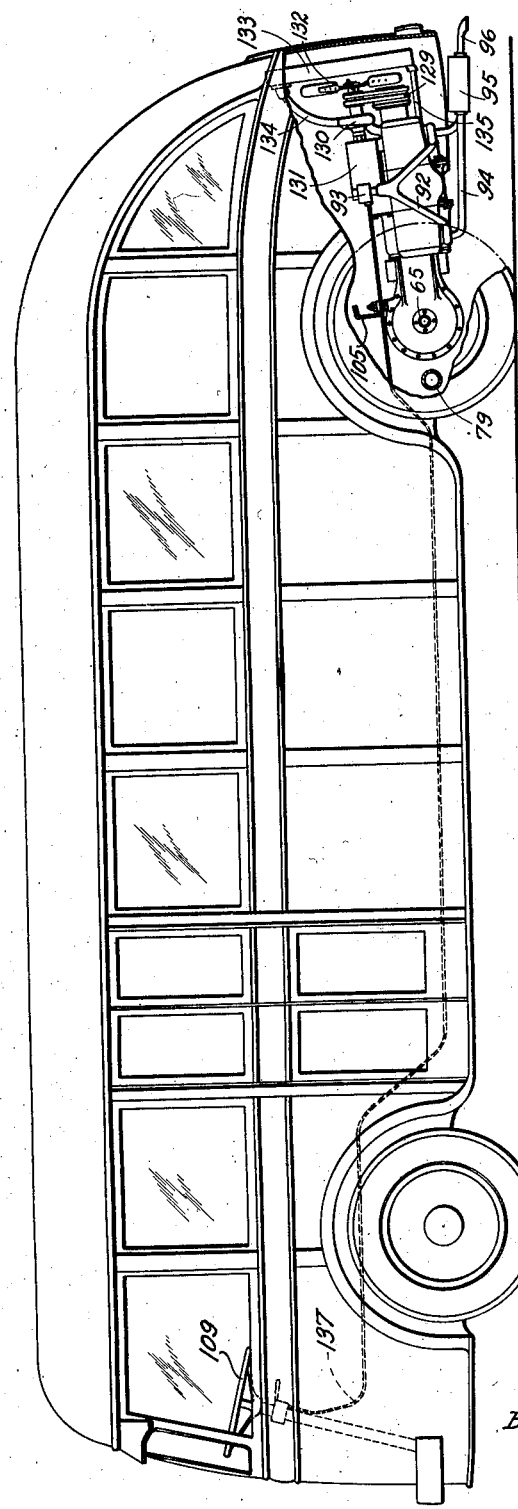
Fig. 1 is an elevational view of a motor coach, portions thereof being broken away to illustrate the position and manner of mounting the engine embodying the present invention.

Referring first to Fig. 4, the engine comprises a housing 10 formed with bearing bosses 11 for the reception of anti-friction bearings 12 and 13 which support the end portions of the crank shafts 14 for each of the cylinder unit assemblies 15. As illustrated herein the cylinders 16 are provided with flanges 17 adapted to be bolted upon the companion flanges 18 in the housing 10. In the instant case a pair of cylinders 16 are cast enbloc, each pair being arranged in opposed relation relative the crank shafts 14. The cylinders 16 are provided with pistons 19 having connecting rods 20 mounted in pairs upon the crank shaft pins 21 and 22. The construction of the pistons, connecting rods and the mounting thereof may be of any form customarily employed in the conventional type of engine. The outer ends of the crank shafts are mounted in cover plates 23 formed with flanges 24 thereon which are journalled upon the end portions of the housing 10 and piloted therein by annular shoulders 25. The inner ends of the crank shafts 14 are provided with beveled pinions 26 which are intermeshed with a bevel ring gear 27 disposed within the central annular portion of the housing 10. The ring gear is formed with a hub 28 adapted to receive an anti-friction bearing 29 which is retained in a bearing bracket 30 supported by ribs 31 extending from the inner periphery of the housing 10 (see Fig. 6). The rear face of the ring gear 27 is constructed to support a multiplate disc clutch 32 of the type usually employed in automotive vehicles. The clutch and outer bearing 33 therefor are retained in a housing 34 bolted to the flanged opening 35 in the face of the housing 10.

The clutch is adapted to drive a shaft 36 mounted in anti-friction bearings 37 and 38. The inner end of the shaft 36 is formed with a gear 39 having the central portion thereof recessed to pilot the transmission drive shaft 40. Upon the shaft 40 there is a plurality of gears intermeshed respectively with the gears mounted on the countershaft 41 (see Fig. 6), the assembly being of the type customarily employed in automobile transmission mechanisms. The countershaft 41 is mounted upon anti-friction bearings 42 and 43 supported in bosses 44 and 45. The boss 44 is supported by ribs integral with the housing 10 while the boss 45 is formed in a housing 46 bolted upon the flanged face 47 of the housing 10 and coaxially aligned with the clutch housing flange 35. The outer end of the shaft 40 is journalled in anti-friction bearings 48 mounted in a boss in the central portion of the end wall 49 of the housing 46. Upon the end of the shaft 40 there is a flange 50 having a brake drum 51 bolted thereon to which there is connected a companion flange 52 affixed to a pinion drive shaft 53 mounted in anti-friction bearings 54 in a boss 55 formed in a differential housing 56 which is secured upon the flanged face 57 of the housing 46. The pinion 58 on the drive shaft 53 is intermeshed with a ring gear 59 coupled with differential gearing 60 of the form customarily employed for automobile rear axle drives. The differential gearing is connected to stub shafts 61 and 62 having flanged end portions which are connected with companion flanges 63 formed with universal joint members 64 at the ends thereof which are coupled with laterally extended drive shafts 65. As will be seen in Fig. 10 the drive shafts 65 project into an axle housing 66 and are provided with an internally splined end portion which receives a drive shaft 67 formed at its outer end with a universal joint coupling 68 operatively connected with a yoke 69 formed in the hub cap 70 of a vehicle road wheel 71. The road wheel 71 is mounted upon anti-friction bearings 72 and is provided with a brake drum 73 and a brake shoe and operating mechanism 74 therefor of the customary type. The axle housing 66 is formed with an enlarged opening adjacent the inner end thereof to facilitate clearance for the movement of the shaft 65 as seen in Fig. 11. The inner end of the axle housing is formed with a spring pad 75 having bored bosses 76 therein which receive the spring U-bolts 77. The rearward portion of the spring pad 75 is constructed with a boss 78 splined to receive an axle tie rod or frame 79 which as illustrated in Figs. 2 and 10 is curved in the central portion thereof to clear the differential housing 56.

Considering now the construction of the engine details and with particular reference first to Figs. 5 and 7, the lower portion of the housing 10 is formed to support the cam shaft 80 which is mounted in anti-friction bearing 81 and a journal bearing 82 formed in the housing cover plate 23. The housing 10 is formed with bosses 83 contiguous the cam shaft 80 having guide bushing 84 thereon to receive the tappets 85 which engage the valve stems 86 of the exhaust and intake valves. The outer ends of the cylinder blocks 16 are provided with cylinder heads 87 formed with combustion chambers 88 and having valve openings 89 thereon for the intake ports 90 and exhaust ports 91. As will be seen in Figs. 1 and 3, the intake port communicates with a manifold 92 leading from a carburetor 93, while the exhaust port 91 is connected with a manifold 94 leading to a muffler 95 and exhaust pipe 96 disposed in the rear of the vehicle. The engine as shown herein is preferably supported upon the vehicle chassis by bolts 97 seated in bosses 98 in the outer rear edge of the housing 10 (Fig. 2). The bolts 97 are mounted in engine arms 99 riveted to the channels 100 constituting the side rails of the vehicle chassis frame. The engine arm assembly is preferably provided with a pair of resilient packing rings 101, such as the metal clad rubber disc illustrated herein. Intermediate the upper face of the boss 98 and the supporting nut there is a helical spring 102 of suitable compressive resistance to support the weight of the engine. The forward end of the engine is supported by studs 103 secured in bosses 104 formed in the upper face of the housing 56 adjacent the medial axis thereof (see Figs. 1, 2, 6 and 10). The studs 103 are supported by a channel 105 constituting a cross member of the vehicle chassis, this engine mounting like that at the rear embodies resilient supporting pads 106 intermediate the cross member 105 and boss 104 and a helical spring 107 on the stud 103 retained by the nut 108.

The vehicle is operatively controlled from the driver's seat in the forward portion of the bus through the steering wheel 109, brake and clutch pedals 111 and 110 respectively and the speed change gear shift mechanism 112. Each of these control members as well as the spark and throttle control, not shown, may be actuated by bell cranks and control rods therefor or as shown by conduits adapted for hydraulic or pneumatic power transmission. In the present embodiment the transmission gearing is actuated through a gear shift lever 113 coordinated with a chamber having fluid communication through the conduits 114 and 115 to a control set 116 disposed in the upper face of the housing 46. The control set 116 embodies a set of rocker arms 117 which are operatively engageable with the gear shift yokes 118 and 119 keyed for reciprocative movement upon the shaft 120 mounted in the upper portion of the housing 46. The brake pedal 111 is preferably connected to a braking system of the well known hydraulic type, the connections therefor comprising the conduit 121 and the transverse feed lines 122 and 123. The emergency brake is coordinated with the brake drum 51, the control mechanism therefor has, however, been omitted from the present disclosure since the form thereof is so well known and understood that it is deemed unnecessary to encumber the present description therewith.

The clutch pedal 110 is controlled through conduits 124 connected with a fluid operated actuating mechanism 125 coupled with an arm 126 (Fig. 6) mounted on a shaft 127 which is organized to effect the reciprocation of the clutch release arms 128 (Fig. 4).

Referring again to Figs. 1 and 2, the outer end of the drive shaft 36 is provided with a sprocket having a chain 129 thereon arranged to drive the water pump 130, generator 131 and fan 132. Adjacent the fan and mounted at the extreme rear of the vehicle there is a radiator 133 provided with the usual water connections 134 and 135 communicating respectively with the water pump and engine water jackets.

In the construction of an engine of the type disclosed herein the cylinder or engine units may be disposed about the periphery of the ring gear housing 10 in any desired relation to afford suitable clearance for the contiguous members of the vehicle chassis. For instance in the exemplification illustrated herein the cylinders are disposed in opposed relation transverse the medial axis of the vehicle chassis. In other applications, however, the cylinders may be arranged radially about the housing 10, the ring gear 26 being intermeshed with the ring gear 27. As will be seen, such organization of driving units facilitates the most advantageous economy of space without sacrifice or modification of the functional parts of the engine such as abnormal thrust upon the crank shaft bearing, complicated valve operating mechanism or sub-unit assemblies which are difficult to dismantle, adjust or repair. The present invention further embodies an engine drive in which one or all of the cylinder units may be simultaneously and synchronously operated or controlled for operation in any desired combination. The advantage of such organization will be recognized in the event failure occurs to one or more of the operating units while the remainder thereof are still in driving condition. An additional advantage of the construction resides in the interposed overrunning clutch 136 which as shown in Figs. 8 and 9, may be housed within the pinion 26. The provision of such a clutch or similar power release mechanism will permit the rotation of the ring gear 26 independent of the movement of any of the crank shafts which may have been released. Thus one or any combination of power driving units may be employed to meet the required driving torque demanded of the engine. In this construction separate distributors, ignition and control switches therefor may be provided for each of prime movers or cylinder units, likewise separate carburetors and throttle control lines may be provided for the engine units. Compression release valves, not shown, and control mechanism from the driver's seat may also be provided to facilitate selective operation of the cylinder units under variable load application upon the vehicle, as for instance, a truck might employ six operative cylinder units when pulling the loaded vehicle up a steep grade or a ramp while but two or three cylinder units would be needed to drive the vehicle on level ground or on a return trip after the pay load was delivered. Likewise in an airplane engine the power application may be varied to meet the flying conditions or in the event one or several of the cylinders became fouled the remaining driving units would continue with a smooth even operation so that the plane could easily be handled and landed in safety.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In combination, a unitary structure comprising a plurality of opposed engines having the cylinders thereof in a common plane, a clutch, a drive shaft therefor disposed in the plane of the medial axis of said cylinders, change speed gearing, a drive shaft therefor disposed in coaxial alignment with said clutch shaft, a rear axle drive mechanism, drive shafts therein disposed in the plane of said change speed gearing shaft, the medial axis of said cylinders being parallel to said clutch and change speed gear shafts.

2. An engine and power transmission mechanism for an automotive vehicle comprising, a housing, a pair of opposed engine cylinders disposed in a common plane and mounted on said housing normal thereto, a clutch housing mounted on the first named housing and normal thereto, a transmission gear housing mounted on the first named housing normal thereto and in coaxial alignment with said clutch housing, and a rear axle drive housing mounted on said transmission gear housing and coaxial therewith.

3. An engine and power transmission mechanism for an automotive vehicle comprising, an engine crankcase, a pair of spaced coaxially aligned crank shafts therein, a pair of opposed cylinders disposed in a common plane in parallel relation to each other and removably mounted on said engine crankcase normal to the axis of said crank shafts therein, pistons in said cylinders, connecting rods on said pistons and connected respectively to said crank shafts, pinions on said crank shafts, a ring gear in said engine crankcase intermeshed with said pinions, a clutch operatively connected with said ring gear and mounted in said engine crankcase, a transmission gearing assembly operatively connected with said clutch and mounted on said engine crankcase, and an axle drive shaft assembly mounted on said transmission gearing assembly and driven thereby.

4. An engine and power transmission mechanism for an automotive vehicle comprising, an engine crankcase, a pair of spaced coaxially aligned crank shafts therein, a pair of opposed cylinders disposed in a common plane in parallel relation to each other and removably mounted on said engine crankcase normal to the axis of said crank shafts therein, pistons in said cylinders, connecting rods on said pistons and connected respectively to said crank shafts, pinions on said crank shafts, a ring gear in said engine crankcase intermeshed with said pinions, a clutch within said engine crankcase and coordinated with said ring gear to form a part thereof, a change speed gearing mechanism, a housing therefor mounted on said engine crankcase parallel to the engine cylinders, a rear axle drive mechanism and a housing therefor mounted on said change speed gearing housing and coaxial therewith.

5. An engine and power transmission mechanism for an automotive vehicle comprising, an engine crankcase, a pair of spaced coaxially aligned crank shafts therein, a pair of opposed cylinders disposed in a common plane in parallel relation to each other and removably mounted on said engine crankcase normal to the axis of said crank shafts therein, pistons in said cylinders, connecting rods on said pistons and connected respectively to said crank shafts, pinions on said crank shafts, a ring gear in said engine crankcase intermeshed with said pinions, said ring gear having a hub thereon extended toward the axis of said crank shafts, a bracket in said engine crankcase disposed intermediate said pinions and having the hub of said ring gear journaled therein, a clutch mounted on said ring gear and operatively connected therewith, transmission gear mechanism operatively connected with said clutch, and supported by said engine crankcase, and an axle drive shaft mechanism operatively connected with said transmission gear mechanism and supported thereby.

6. An engine and power transmission mechanism for an automotive vehicle comprising, an engine crankcase, a pair of spaced coaxially aligned crank shafts therein, a pair of opposed cylinders disposed in a common plane in parallel relation to each other and removably mounted on said engine crankcase normal to the axis of said crank shafts therein, pistons in said cylinders, connecting rods on said pistons and connected respectively to said crank shafts, pinions on said crank shafts, a ring gear in said engine crankcase intermeshed with said pinions, a clutch operatively connected with said ring gear and mounted in said engine crankcase, a change speed gearing assembly operatively connected with said clutch and mounted on said engine crankcase intermediate said engine cylinders in the plane of the medial axis thereof and parallel thereto, and an axle drive mechanism operatively connected to said change speed gearing assembly and in a common horizontal plane therewith.

7. An engine and power transmission mechanism for an automotive vehicle comprising, an engine crankcase, a pair of spaced coaxially aligned crank shafts therein, a pair of opposed cylinders disposed in a common plane in parallel relation to each other and removably mounted on said engine crankcase normal to the axis of said crank shafts therein, pistons in said cylinders, connecting rods on said pistons and connected respectively to said crank shafts, pinions on said crank shafts, a ring gear in said engine crankcase intermeshed with said pinions, a clutch within said engine crankcase, said clutch comprising a relatively heavy cylindrical shell and a clutch plate rotatable therewith, said cylindrical shell being affixed to said ring gear and constituting therewith and with said clutch plate a fly wheel for said engine, a transmission gearing assembly operatively connected with said clutch and mounted on said engine crankcase, and an axle drive shaft assembly mounted on said transmission gearing assembly and driven thereby.

8. An engine and power transmission mechanism for an automotive vehicle comprising, an engine crankcase, a pair of spaced coaxially aligned crank shafts therein, a pair of opposed cylinders disposed in a common plane in parallel relation to each other and removably mounted on said engine crankcase normal to the axis of said crank shafts therein, pistons in said cylinders, connecting rods on said pistons and connected respectively to said crank shafts, pinions on said crank shafts, a ring gear in said engine crankcase intermeshed with said pinions, a clutch within said engine crankcase and coordinated with said ring gear to form a part thereof, a change speed gearing mechanism, a housing therefor mounted on said engine crankcase parallel to the engine cylinders, a boss in said change speed gearing housing, a journal bearing therein, a boss in said engine crankcase, a journal bearing therein, a transmission jack shaft mounted in said journal bearings, gears on said jack shaft coordinated with the gears in said change speed gearing mechanism, a rear axle drive mechanism, a housing therefor, said housing being mounted on said change speed gearing housing.

JOHN F. BROBSON.